April 10, 1956 A. W. SCHNEIDER ET AL 2,741,667

PRIVACY GUARDED TELEPHONE INTERCOMMUNICATING SYSTEM

Filed Feb. 11, 1953 3 Sheets-Sheet 1

INVENTORS.
ARTHUR W. SCHNEIDER
BERNARD COOPERMAN
DONALD G. ALLEN
BY John J. Rogan
ATTORNEY.

INVENTORS.
ARTHUR W. SCHNEIDER
BERNARD COOPERMAN
DONALD G. ALLEN
BY John J. Rogan
ATTORNEY.

INVENTORS
ARTHUR W. SCHNEIDER
BERNARD COOPERMAN
DONALD G. ALLEN
BY John J. Rogan
ATTORNEY United States Patent Office | 2,741,667
Patented Apr. 10, 1956

2,741,667

PRIVACY GUARDED TELEPHONE INTERCOMMUNICATING SYSTEM

Arthur W. Schneider, Mamaroneck, Bernard Cooperman, Bronx, and Donald G. Allen, Massepequa Park, N. Y., assignors to Commercial Radio-Sound Corp., New York, N. Y., a corporation of New York Application February 11, 1953, Serial No. 336,376
18 Claims. (Cl. 179—39)

This invention relates to telephone intercommunicating systems and more particularly to such systems which do not have a central switching station.

A principal object of the invention is to provide a simplified telephone intercommunicating system as distinguished from central exchange systems, wherein complete privacy is obtainable for two or more interconnected lines.

Various forms of so-called house or intercommunicating systems have been proposed heretofore, and numerous attempts have been made in such systems to protect two interconnected stations against having their privacy invaded unauthorizedly by any other station. However, we have found that such prior systems are not entirely fool-proof against privacy invasion under all conditions, and where attempts have been made to obtain reasonably complete privacy, the system must be correspondingly increased in complexity and cost of installation. The present invention, therefore, has, as one of its important objects, the obtaining of privacy in an intercommunicating system, with a minimum of wiring, a minimum of relays, and a minimum of switching equipment.

Another object is to provide a telephone intercommunicating system employing only a single relay at each station, and wherein privacy is obtained without requiring marginally sensitive relays or relatively complex resistances and switching arrangements.

In certain prior intercommunicating systems, wherein privacy is provided for, the privacy guarding circuits are dependent for their successful operation upon the voltage level of the common battery which is used for the various relays. Consequently, when a large number of stations are to be provided for, if the common relay battery should drop substantially in voltage, the privacy condition is endangered, if not entirely destroyed.

Accordingly, it is another object of this invention to provide a simplified intercommunicating system wherein the privacy characteristic is substantially independent of the number of stations in the system and of the level of the relay battery. If the battery should become dead or of extremely low value approaching deadness, the system is entirely inoperative so far as being able to make any additional interconnections, but the previously established interconnections are maintained against privacy invasion. In prior known systems of this type, when the relay battery voltage drops even a relatively small percentage, and while additional interconnections can be made, such additional connections are not guarded against privacy invasion because the privacy condition is dependent upon the battery voltage. In fact, according to the present invention, it is possible to use relatively low voltage relays while employing a relay battery of many times greater voltage. Consequently, the privacy will be maintained even if the relay battery should be near the end of its useful life.

Another object is to provide a telephone intercommunicating system of the kind which employs a single relay at each station, and in conjunction with circuit arrangements so that when two stations are connected, only one relay, namely the relay of the calling line, is operated. In prior systems of this kind it has been necessary to operate the relay at the calling station and the relay at the called station.

Another object is to provide a telephone intercommunicating system of the kind which employs a single relay at each station, in conjunction with a momentary pulsing circuit whereby only the calling line relay is operated by a momentary pulse controlled by the called line when answering the call. As a result of this requirement for a momentary pulse operation, any third party is prevented from breaking in on the previously established connection.

Another object is to provide a telephone intercommunicating system of the kind wherein each station is equipped with a series of buttons one for each of the remaining stations, in conjunction with a single relay and associated circuits whereby a third party cannot listen-in unauthorizedly no matter what combination of buttons said third party should deliberately operate.

In prior intercommunicating systems where the privacy conditions are protected by differential currents or combinations of resistances, the privacy is endangered when the relay battery voltage drops even a relatively small amount, and that condition is aggravated by the fact that all the relays require continual current flow to maintain them operated. The present invention requires current for only a single relay and then only during a brief momentary pulse period. The relay battery which can be of comparatively high voltage continuously charges a large capacity condenser and the discharge current from this condenser is momentarily used to provide said momentary pulse.

Another object is to provide a simplified telephone intercommunicating system which is capable of conference connections between three or more stations without requiring a master station to set up the conference connection, and while also preserving the same privacy safeguards as those which exist when only two stations are interconnected.

A feature of the invention relates to a novel arrangement for telephone intercommunicating systems whereby an alarm is automatically given to two normally interconnected stations when a third party is trying to manipulate the system to break in. This alarm is prevented from reaching the said third party.

Another feature relates to a simplified telephone intercommunicating system using a single control relay at each station, which operates in the nature of a lock-in relay, as distinguished from a conventional lock-out relay. In the usual lock-out relay arrangement when a calling station attempts to call a busy station, the lock-out relay of the calling station operates and opens the talking circuit leading from the calling station. Since, however, the said lock-out relay relies for its operation on a predetermined busy voltage signal or condition, if the relay battery should be low in voltage, the lock-out relay would never operate and privacy would be destroyed. This condition is completely obviated by the present invention sice the control lock-in relay at any calling station is operated by a momentary pulse under control of the answering by the called station.

Another feature relates to a novel and simplified busy indicator for each station, whereby a busy lamp or other busy indicator is normally connected in circuit with a battery which, however, does not operate the indicator at the calling station if the called station is idle, but does operate the buzzer at that called station. On the other hand, if the called station is busy, and without the necessity of operating any additional switches, an alternative circuit is provided which includes the relatively low direct current resistance of a retard coil or similar element at the called station in place of the relatively high resistance buzzer thereat. This now results in operation of the busy indicator at the calling station. Additionally, under the latter condition another battery is connected in circuit to insure the operation of the busy indicator, and in any event the busy indicator is operated only as long as the calling station selector button is fully operated for ringing.

A further feature relates to the novel organization, arrangement and relative interconnection of parts which cooperate to provide a simplified and improved telephone intercommunicating system with complete privacy characteristics.

Other features and advantages not specifically enumerated will be apparent after a consideration of the following detailed descriptions and the appended claims.

In the drawing,

Figs. 1 and 2, when laid side-by-side, with Fig. 2 to the right of Fig. 1, show a complete six-station intercommunicating system embodying all the features of the invention. It will be understood, of course, that a greater or less number of stations may be provided.

*The station equipment*

Figure 1:
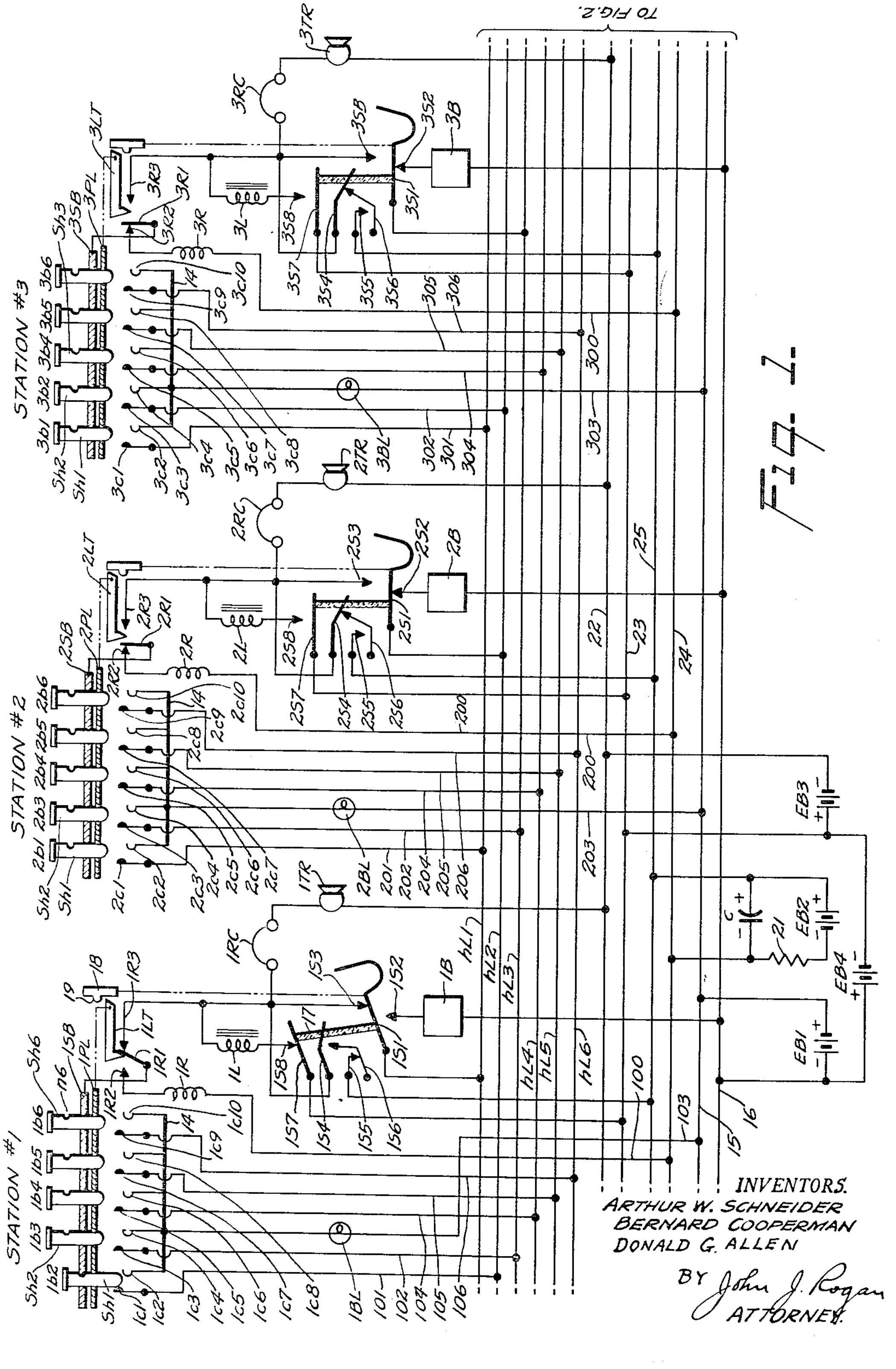

Referring to the drawing, it will be seen that each station is equipped with a set of manually operable station selector buttons, a single lock-in or privacy guard relay; a telephone transmitting and receiving handset with its associated cradle controlled contact switch and retard coil; a busy lamp; and a single buzzer. Since these units are the same at each station, detailed description thereof will, insofar as necessary, be confined to the units at station #1. However, the corresponding parts at the various stations bear analogous designation indicia. Thus, at station #1, all of the station selector buttons, e. g. 1*b*2, 1*b*3, etc., have the prefix 1, and each has a different individual suffix 2 . . . 6 to identify the particular station to which they respectively control the establishment of a connection. Likewise, at station #2, the numerical suffix of the selector buttons **2*b*1, 2*b*2**, etc., identify them with respect to the other stations to which station #2 is to be connected; and so on for the button sets at the remaining stations. The single lock-in or privacy guard relay, e. g., 1R at each station, is designated R with a prefix numeral designating its associated station to which it is individual. Likewise, the cradle controlled contacts associated with the telephone handset at each station are designated S1–S8 with a corresponding prefix numeral identifying the associated station. A similar plan of designations is used for the analogous elements at the various stations.

Referring to station #1, the control buttons 1*b*2 . . . **1*b*6** have conductive shanks S*h*1, S*h*2, etc., which are in slidable contact with a common metal plate 1SB. Each button shank has a shallow notch *n*1, *n*2, etc., so that when the button is partly depressed, as shown for button 1*b*2, it locks itself in that position. However, the buttons are interconnected with a shiftable plate 1PL, 2PL, etc., which is so arranged that when one button is depressed it automatically releases any previously depressed button. Since such mutually releasable button locking arrangements are well known, detailed description is not required herein.

Electrically associated with each button shank are two contacts mounted at different levels so that when the button is in its partially depressed position it engages with one contact but when it is fully depressed it engages both contacts. Thus, as shown in the drawing, button **1*b*2 is shown in its partially depressed position where it is locked and in engagement with the contact 1*c*1. However, the button can be further depressed manually so that it also connects with contact 1*c*2, as well as with 1*c*1**. Each of the contacts 1*c*1, **1*c*3 . . . 1*c*9 is connected to a corresponding conductor 101, 102, 104, 105, 106**, each of which conductors is multipled to the busses *h*L–1 . . . *h*L–6, which busses are common to the various stations. The other contacts 1*c*2 . . . **1*c*10 are connected to a common contact strip 14 which is connected by way of busy lamp 1BL and conductor 103 to the signal bus 15 connected to the positive pole of the signal battery EB–1. Battery EB–1 and bus 15** are common to all the stations.

Each station also has a buzzer 1B, 2B, etc., one side of which is connected to the common battery return bus 16 which is connected to the positive pole of battery EB–1. Each station also has a telephone handset including the telephone transmitter 1TR and telephone receiver 1RC. This handset may be of any well known construction and is provided with the usual cradle upon which the handset rests. When the cradle is in its normal position with the handset resting thereon, it closes a circuit to contact 1S2 and opens the circuit through contact 1S3. The cradle is also mechanically connected to an insulator strip 17 which carries three contact springs 1S1, 1S4 and 1S7. The spring 1S1 cooperates with the respective contacts 1S2 and 1S3. The spring 1S7 cooperates with the associated contact 1S8. The spring 1S4 forms part of a make-before-break switch which includes the said spring 1S4 and the contact springs 1S5, 1S6 whose function will be described hereinbelow. Also associated with each handset is the usual retard coil 1L, 2L, etc. for diverting the pulsating talking currents away from the common talking battery EB–3.

For the purpose of controlling privacy, each station has an individual lock-in relay 1R, 2R, etc., which receives operating current only during a momentary period while the called station is removing its handset from its cradle, during which instant the contact springs 1S4, 1S5 and 1S6 are all in contact. When the handset has been completely removed from the cradle the contacts 1S4, 1S6 open, but the contacts 1S5 and 1S6 remain closed. Preferably, although not necessarily, this momentary switch forms part of the cradle switch, as above-mentioned, although any other momentary operating switch may be employed. For example this momentary switch may be a separate button provided on the handset, which switch when operated closes a momentary circuit in the same way that contacts 1S4, 1S5 and 1S6 close a momentary circuit. The handset cradle with its associated controlled contacts for station #1 is shown in its completely raised condition where the handset has been removed from its cradle. On the other hand, the handset and associated cradle switch contacts at station #2 are shown in a condition where the handset is resting on its cradle as is true for the remaining stations. The circuits are arranged so that only the momentary closure of the cradle contacts e. g., contacts 2S4, 2S5, 2S6 at the called station is effective to operate the privacy guard relay, e. g. relay 1R at the calling station.

As shown for station #1, when the handset is removed, and while the cradle is moving upwardly, the contact 1S5 engages the contact 1S6 while contact 1S5 is still in engagement with contact 1S4. When the cradle at the called station reaches its uppermost position this momentary circuit is open at contacts 1S4 and 1S6. The momentary closure of the cradle contacts at the called station is taken advantage of to apply a momentary high voltage operating current pulse to the guard relay, e. g. relay 1R of the calling station. In other words, the guard relay at the calling station does not operate until the handset at the called station is being removed from its cradle.

Each relay 1R, 2R, etc., is of the mechanical latching type so that as soon as the relay receives the momentary operating pulse it moves its armature 1R1, 2R1, etc. away from its normally closed contact 1R2, 2R2, etc., and the armature engages with its contacts 1R3, 2R3, etc. When so moved, the armature is mechanically latched in its operated position by a latch 1LT, 2LT, etc. The latch may be held normally, for example by a suitable spring, in the position shown in the drawing wherein it tends to latch with the armature, for example armature 1R1 when the relay 1R is energized. A suitable member schematically represented by the numeral 18 having a small projection 19 may be movable with the telephone cradle so that when the handset is replaced on the cradle, the projection 19 momentarily trips the latch 1LT, thus permitting the armature 1R1 to move back to its normal position. If desired, the latch 1LT can be similarly tripped by a suitable mechanical connection to the movable button locking bar 1PL as represented by the dot-dash line. Furthermore, if desired, the member 1LT instead of being tripped by the handset or by the plate 1PL, can be tripped by a separate depressible button for operating a tripping member such as 18. Consequently, if the calling station wishes to make a new call to a different station without replacing the handset, the movement of plate PL resulting from the operation of the new station selector button, also unlatches the relay armature.

All the relays at the various stations are operated from a common battery EB2, which is in circuit with a large capacity condenser C in series with a current limiting resistor 21. This condenser-battery-resistance combination forms an important part of the system since it enables the relays 1R, 2R, etc., to be designed as relatively low voltage relays while the battery may have a voltage which is many times that for which the relays would be normally designed to operate. The condenser C is at all times fully charged to the full battery voltage, but the current drain from the condenser exists only momentarily for each relay. This provides a much longer working life for battery EB2 and provides a more positive assurance of the momentary operation of the guard relay.

*Normal operation (two-station call)*

Let it be assumed that the party at station #1 desires to call the party at station #2. The calling party removes his handset from its cradle and depresses button 1*b*2 to its fullest extent. Thereupon, a circuit is completed from the positive pole of battery EB1, bus 15, conductor 103, lamp 1BL, contact 1*c*2, shank S*h*1, contact 1*c*1, conductor 101, bus *h*L2, contacts 2S1, 2S2 of the handset at station #2, buzzer 2B and thence by bus 16 to the negative pole of battery EB1. This causes the buzzer 2B to operate at station #2 and it continues to buzz until either the called station answers by removing the handset from its cradle or by the calling party releasing the pressure on button 1*b*2, which then returns to its locking position with respect to bar 1SB. In this position it maintains contact between shank S*h*1 and contact 1*c*1. While the busy lamp 1BL is included in the buzzer or ringing circuit and the called station is idle, the lamp 1BL does not light because of the high resistance of the buzzer winding in series with it and because of the relatively low potential of battery EB1. If, however, called station #2 had been busy at the time station #1 was calling station #2, the buzzer 2B at the called station would be out of circuit but there would be connected in circuit with the busy lamp 1BL the additional battery EB4 which causes sufficient current to flow through the lamp 1BL to light it fully, to indicate that the called station is busy. This circuit is traceable from the positive terminal of battery EB1, conductor 103, lamp 1BL, contacts 1C2, 1C1, bus *h*L2, switch hook contacts 2S1, 2S3, retard coil 2L, switch hook contacts 2S8, 2S7, negative terminal of battery EB4, and thence through battery EB4 to the negative terminal of battery EB1. Because of the increased voltage thus obtained, and because of the relatively low direct current resistance of the retard coil 2L, sufficient current flows to illuminate lamp 1BL to indicate that station #2 is busy.

The called party at station #2, upon removing the handset from its cradle, causes the cradle arm to rise upwardly to break the buzzer circuit and releases the pressure on the contact springs 2S4 and 2S7, whereby a circuit is completed from the negative pole of the talking battery EB3, bus 22, transmitter 2TR, receiver 2RC, retard coil 2L, contacts 2S8, 2S7, bus 23 to the positive pole of the talking battery. The talking busses 22 and 23 likewise connect the battery EB3 to the transmitter 1TR, receiver 1RC and the retard coil 1L at station #1.

As the cradle of station #2 is rising it closes the above described momentary circuit between contacts 2S4 and 2S5 by way of contact 2S6. During this momentary closure a high voltage pulse is transmitted over a circuit traceable from the negative side of condenser C, bus 24, conductor 100, winding of relay 1R, contact 1R2, and armature 1R1, bar 1SB, shank S*h*1, contact 1*c*1, conductor 101, bus *h*L–2, cradle switch contacts 2S1, 2S3, 2S4, 2S6, 2S5, bus 25 to the positive side of condenser C. Thus, relay 1R momentarily receives a high energy pulse from condenser C. This is enough to move the armature 1R1 into latching engagement with the latch 1LT. The above described energizing circuit for the relay winding is therefore broken not only by the cradle switch at station #2 when it reaches its uppermost position but also when the armature 1R1 leaves its contact 1R2. The condenser C then recharges through the resistor 21 which resistance can be made of a relatively high value so as to limit the maximum current drain from the battery EB–2 as a result of the above momentary relay operating pulse. This current may be of such a small value as to be relatively insignificant with respect to the useful life of the battery EB–2. This arrangement not only assures positive action in the operation of relay 1R but it also provides for a useful battery life virtually equal to its shelf life. Since relay 1R is now mechanically latched, it requires no further operating current and it completes the talking circuit by connecting the two-way telephone circuit to the bus *h*L–2 by way of switch bar 1SB and contact 1*c*1.

It should be observed that in the above described establishment of the talking circuit, the only relay that is operated is the relay 1R at station #1. The corresponding relay 2R at station #2 remains in its normal condition. When the calling party replaces the handset on the cradle the latch 1LT is mechanically released and the armature 1R1 returns to its normal position to engage contact with 1R2. This effectively breaks the talking circuit between the two stations.

*Attempted privacy invasion (Example No. 1)*

If, during the establishment of the above described talking circuit, a party at some other station, for example station #3, should attempt to call a party at either station #1 or station #2, station #3 is unable to listen-in or interrupt the established talking circuit because contacts 3R3 and 3R1 of relay 3R are open and the handset at station #3 is disconnected from all the talking circuits. Relay 3R cannot get operating energy except from the momentary cradle switch contacts S4, S5, and S6 of either station #1 or station #2, and since these contacts are now open, as above described, relay 3R will not operate.

The party at station #3, for example, may attempt to call station #1 by removing the handset at station #3 and depressing button 3*b*1. While the button 3*b*1 prepares a circuit for relay 3R from the negative side of condenser C, bus 24, winding of relay 3R, contacts 3R2, 3R1, bar 3SB, button 3*b*1, contact 3*c*1, conductor 301, bus *h*L–1, this circuit is not complete since there is no possible return path back to the relay battery EB–2, which is opened at the cradle switch contacts of the interconnected stations #1 and #2. Therefore( relay 3R cannot be energized and the talking circuit for station #3 remains open. Of course, the party at station #3 may call any other idle station by operating the appropriate station button, as was described above in connection with the establishment of the connection between stations #1 and #2.

*Attempted privacy invasion (Example No. 2)*

If a party, for example the party at station #3, should attempt to eavesdrop on a previously established conversational connection, for example that between stations #1 and #2, by way of calling either of the busy stations #1 or #2, and an idle station, for example #4, at the same time, privacy will still prevail. The party at station #3 might believe that when the party at station #4 removes his handset in order to answer the call, relay 3R might be operated and the party at station #3 might thereby be able to listen into the conversation beween station #1 and station #2. This possibility is prevented in the system as disclosed, and furthermore a special alarm signal is made audible in the receivers of stations #1 and #2 to indicate to the parties thereat that some third party is deliberately attempting to break in on the conversation. The interrupting party at station #3, however, receives no indication that such alarm has been given.

As an illustration, let it be assumed that the party at station #1 is talking to the party at station #2 and that a party at station #3 attempts to interrupt them by operating button **3*b*1 and button 3*b*4 simultaneously. The immediate result is that the buzzer 4B** at station #4 starts to vibrate and continues to vibrate until the party at station #4 lifts his receiver. This alarm signal is transmitted to the telephone receivers at stations #1 and #2 as a loud buzz, thereby informing the parties at those stations that someone is attempting to eavesdrop on their conversation, but the interrupting party has no indication that he has set off this alarm signal. Should the party at station #4 answer the call by removing the handset this disconnects the buzzer which then becomes silent in the receivers at stations #1 and #2. If the party at station #4 should replace his handset on its cradle, his buzzer once again starts to vibrate and continues to do so until the handset at the interrupting station #3 is replaced. Here again, the signal is also received at station #1 and #2 until the party at station #3 replaces his handset.

It should be observed that this alarm signal in no way interrupts or is repeated to any other conversational connections that have been normally established between other parties in the system, for example between stations #5 and #6, providing, of course, the interrupting party at station #3 has not also pressed button **3*b*5 or button 3*b*6**. In other words, with respect to any perviously and normally interconnected stations, if an interfering party attempts to break in by operating a button corresponding to an idle station and one or more buttons corresponding to busy stations, all the parties at the busy stations are informed of this attempt to break in.

The circuit through which the buzzer and signal is repeated to the previously interconnected stations will now be described, on the assumption that stations #1 and #2 are interconnected, and stations #3 depresses buttons **1*b*1 and 1*b*4 in an attempt to eavesdrop on the conversation between stations #1 and #2. A circuit is traceable from the positive pole of the alarm battery EB4, bus 16, buzzer 4B at station #4 which vibrates, normally closed cradle switch contacts 4S2 and 4S1**, bus *h*L4, conductor 304 at station #3, button contacts **3*c*5, shank Sh3 of button 3*b*4, switch bar 3SB, shank of button 3*b*1, contact 3*c*1, conductor 301**, bus *h*L1, contacts 1S1 and 1S3, retard coil 1L, contacts 1S8 and 1S7, bus 23 to the negative side of alarm battery EB4. It should be observed that busses *h*L1 and *h*L2 normally are under the above assumed conditions connected together by way of button **1*b*2 at station #1. Therefore, the buzzer current develops an interfering signal across the retard coils 1L and 2L or across any other equivalent network such as is commonly used in telephone systems to segregate the direct current battery voltage from the pulsating or voice frequency voltages. It should be observed that in the above traced circuit, retard coils 1L and 2L are in parallel. Therefore, this audio frequency buzzer voltage is transmitted to the receivers 1RC and 2RC** only and the amplitude of the signal can be made of such an intensity as to preclude any further intelligible conversation between stations #1 and #2. Therefore, the parties at stations #1 and #2 are not only notified of an unauthorized attempt to break in on their conversation but even then no intelligible conversation can be transmitted.

It is significant to note that the interfering party at station #3 when depressing buttons **3*b*1 and 3*b*4 as above described, need not press these buttons to their lower position in order to give the alarm. In other words, while the system is arranged to transmit normal ringing current to the respective buzzers only when the buttons are depressed to their lower position, an interfering party might think that by merely partially depressing the button without closing the normal ringing circuit, he could listen in. However, as pointed out above, the mere partial depression of two buttons brings the alarm battery EB4** into play to give the alarm to the interconnected stations.

*Abnormal circuit conditions*

As pointed out hereinabove, the privacy is guarded primarily by the operation of a single relay, e. g. 1R at the calling station but which is operated only when the called station closes the momentary cradle switch contacts. Therefore, the privacy protection is not dependent upon any particular test voltage that may exist at the called station. For example, in prior known systems of this general type where a single relay may have been employed at each station, the operation of this single relay has been dependent upon a suitable test voltage condition at the called station. If for any reason this test voltage drops materially below its assigned value, the so-called guard relay may never operate and a third party may therefore be able to break in on the connection. In the circuit according to the invention, the battery EB2 is not used directly or continuously to operate the guard relay but is used merely to charge the condenser C. This condenser therefore can be charged to a very high voltage to produce a high voltage pulse and this pulse is only transmitted while the telephone handset at the called station is being removed from the switch hook. Therefore, there is double protection against privacy invasion since the circuit does not depend upon maintaining a predetermined fixed test potential nor does it depend upon marginal current flow conditions to determine whether the called station is busy or idle.

*Conference connections*

The circuits are so arranged that three or more stations may be interconnected while maintaining the above-noted privacy safeguards. The conference connection is accomplished by having each station call only one other station in the conference chain. For example, let it be assumed that station #1 desires to have a conference with stations #4, #5 and #6. To accomplish this result, the party at station #1 after removing the handset from its cradle, depresses button **1*b*6 to its lower position to operate buzzer 6*b* at station #6 in the normal manner as above described. When the party at station #6 answers and lifts the handset from its cradle, relay 1R at station #1 operates and protects the connection against privacy invasion, while also completing the talking circuit between station #1 and #6. The party at station #6 then operates button 6*b*4 to call station #4. When the party at station #4 removes the handset from its cradle, relay 6B** at station #6 operates to guard the connection against privacy invasion and to complete the talking circuit between stations #1, #6 and #4. Then the party at station #4 operates button 4b5, and while the party at station #5 is removing the handset from its cradle, relay 4R operates to preserve the privacy condition and to complete the talking circuit between stations #1, #4, #5 and #6. The parties at stations #1, #4, #5 and #6 are now interconnected for conversation with each other. It should be observed that privacy still exists and if an uninvited party, for example the party at station #3 attempts to break in by any of the procedures described above, the alarm signal is transmitted to stations #1, #4, #5 and #6, and the party at station #3 is unable to listen in on the conversation even though he does not know that an alarm is being given to the other stations #1, #4, #5 and #6.

It should be observed that when two stations are interconnected in the normal maner, for example stations #1 and #2, when the conversation has been completed both parties replace their handsets on their respective cradles. As a result the mechanically operated latch 1LT is tripped and releases the armature 1R1 which restores to normal and breaks the talking circuit. Should the party at station #1 desire to call the party at another station after completing his conversation with station #2, he need not replace the handset, but merely depresses the button to select the desired station. The depression of the new button causes the member 1PL to move and trip the latch 1LT permitting armature 1R1 to restore to normal and open the talking circuit. If the desired new station is not busy, the lifting of the handset causes reoperation of relay 1R and the closure of the talking circuit with the privacy conditions above described.

It should be observed that relays 1R, 2R, etc., rather than acting in the nature of lock-out relays, operate as what may be termed as lock-in relays. In the conventional systems where a lock-out relay is used, such a relay operates when a calling station attempts to call a busy station. If in such prior systems the relay battery should fail or be substantially below normal voltage, privacy would no longer be in effect and no warning of the fact that the system is operating as a non-private system is given. In the system according to the present invention, the relays 1R, 2R, etc., must be operated before a conversation can take place, therefore in the event of battery failure the system fails to operate thereby indicating that there has been such a battery failure.

Figures 3, 4:
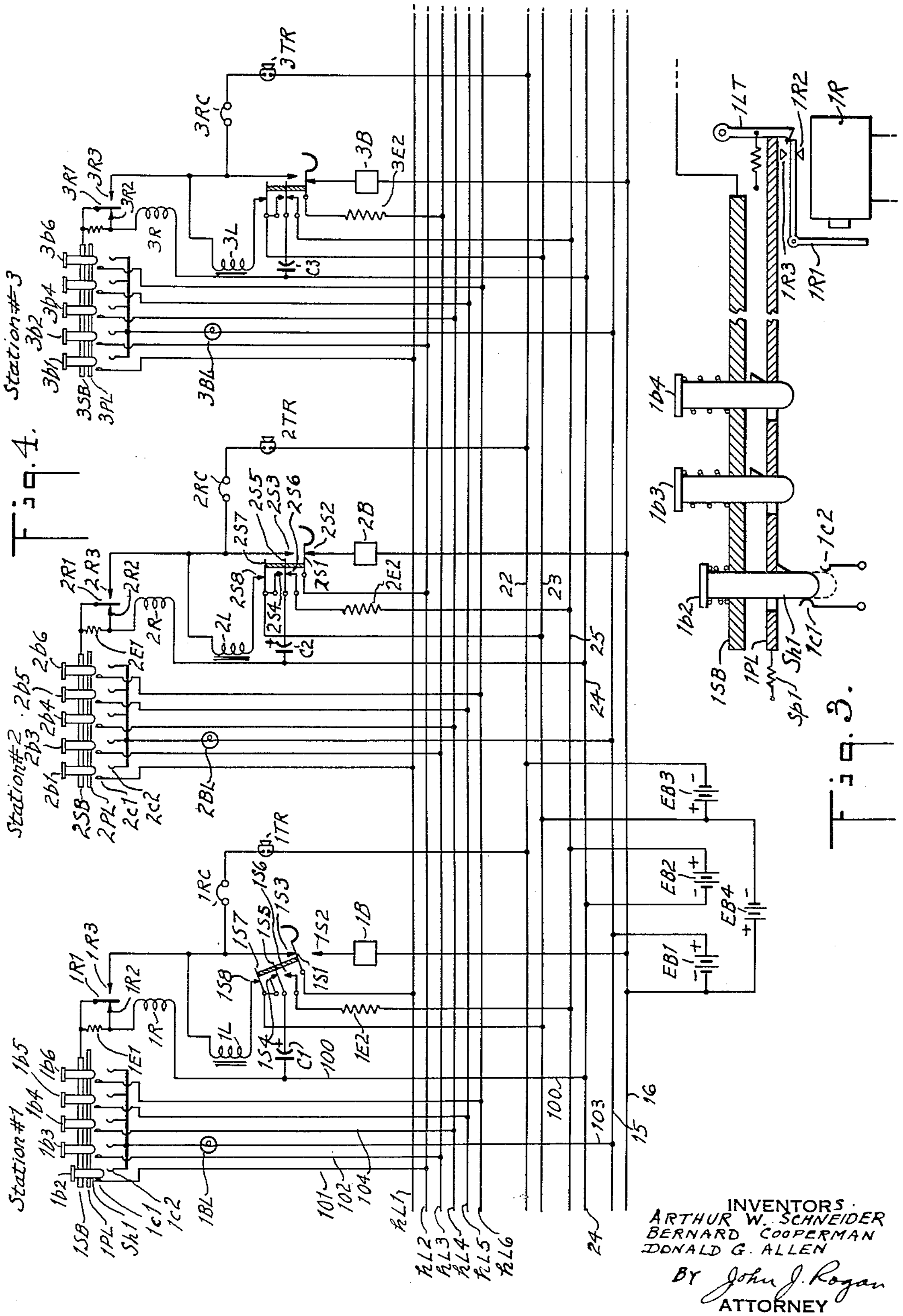
Fig. 3 is an enlarged schematic diagram of one typical selector button arrangement.
Fig. 4 is a detailed wiring diagram of a preferred modification of the system of Figs. 1 and 2.

Referring to Fig. 3, there is shown in greater detail a typical arrangement for locking and unlocking the various selector buttons and the means for unlatching the guard relay armature by the operation of a selector button. The parts of Fig. 3 which are the same as those of Figs. 1 and 2 bear the same designation numbers. As shown in Fig. 3, each key shank has an inclined tooth, which when the key is depressed causes the plate 1PL to shift to the right against the pull of spring Sp1. This releases all the remaining buttons to their normal positions, as shown for buttons 1b3, 1b4. The plate, after clearing the tooth, immediately springs back and latches the button in its operated position, as shown for button 1b2. Each button tends to assume its fully raised position by means of a suitable spring. However, even when the button is latched by the plate 1PL it is still capable of being pushed and held down even further to engage the ringing contact 1c2, as well as home line contact 1c1, and when it is released it springs back to the latched position.

Figure 2:
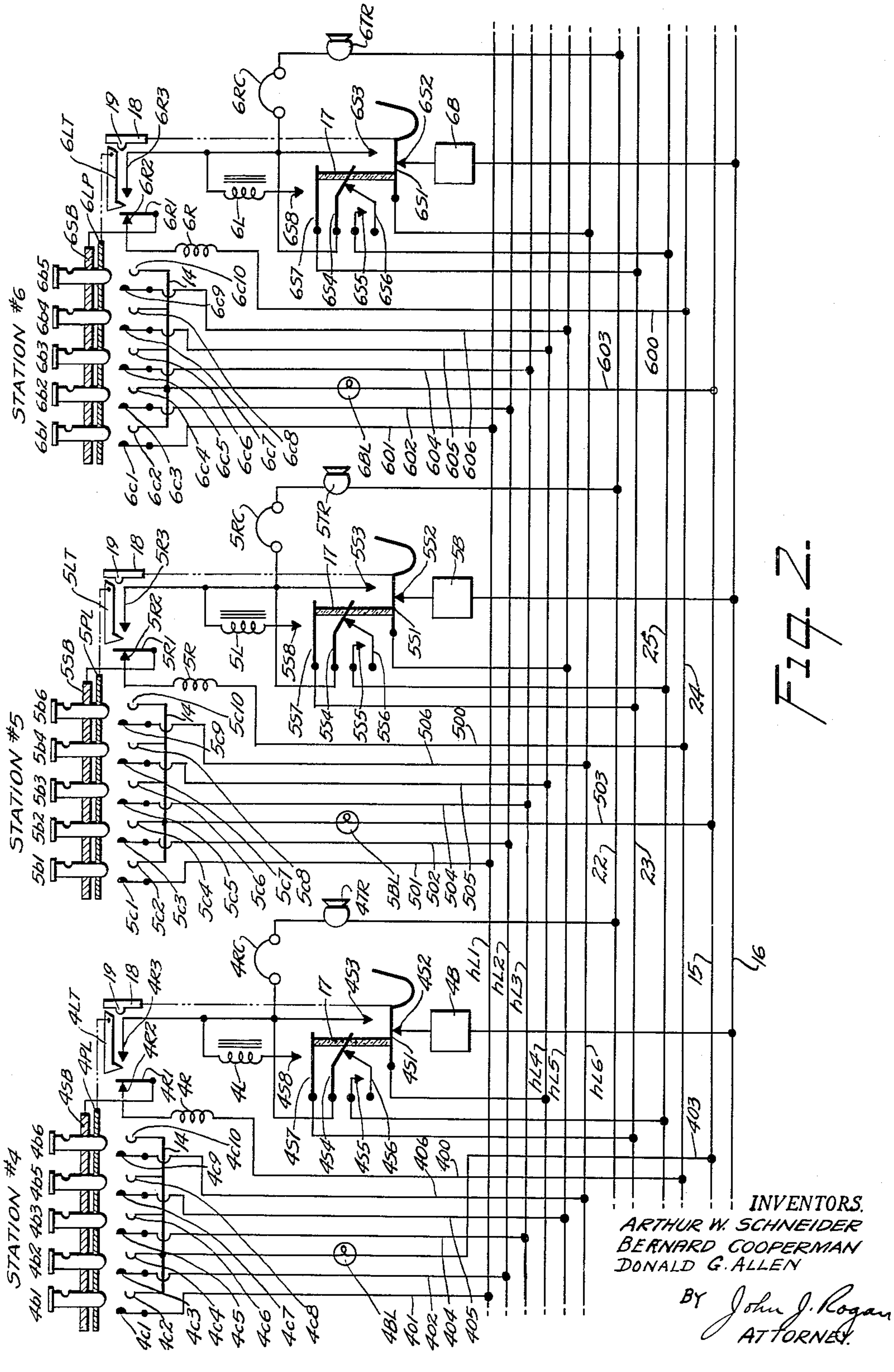

Referring to Fig. 4, there is shown a preferred modification of the system according to the invention. The chief difference between the system of Fig. 4 and that of Figs. 1 and 2 is that instead of having a single condenser, namely condenser C (Fig. 1) common to all the stations for discharging into all the relays, a separate condenser is provided at each station. Each station condenser is, when the associated telephone set is on the cradle, provided with a charging circuit so that the condenser remains fully charged by battery EB2. When a station is called and the telephone set thereat is removed from its cradle, the condenser at the called station is connected in a discharging circuit with the privacy guard relay at the calling station. Thus, the guard relays are never connected directly to the relay battery EB2. The only current that a guard relay receives is the momentary discharge current from the condenser at the called station.

Fig. 4 shows a three station system, but it will be understood, of course, that a greater or less number of stations may be employed. The system, insofar as the selective operation by the station buttons, the ringing condition, the busy condition, and the privacy and alarm conditions are identical with those described above in connection with Figs. 1 and 2. For the purpose of explaining the system of Fig. 4, it will be assumed that station #1 is calling station #2. When a station is idle or not in use, the associated condenser C1, for example, is provided with a charging circuit traceable from the negative terminal of battery EB2, conductor 100, condenser C1, switch hook contacts 1S5, 1S6, current-limiting resistor 1E2 to the positive terminal of battery EB2. Therefore, the condenser C1 remains fully charged to the full potential of battery EB2 as long as the telephone set is on the cradle. The corresponding condensers C2, C3, etc., at the remaining stations are, of course, likewise fully charged when the telephone sets are on their respective cradles. Assuming that station #1 is calling station #2 and for that purpose has depressed button 1b2, the circuit described above in connection with Fig. 1 and Fig. 2 is closed through the buzzer 2B and the busy lamp 1BL. If the called station is idle, the busy lamp 1BL does not light, but the buzzer 2B vibrates. If the called station is busy, the circuit through the buzzer 2B is open and the battery EB4 is connected in series with the battery EB1 through switch hook contacts 2S7, 2S8, retard coil 2L, switch hook contacts 2S3, 2S1, conductor hL2, contacts 1c1, 1c2, lamp 1BL to the positive side of battery EB1.

If station #2 is idle when called, the removal of the telephone set at station #2 from its switch hook closes a discharge circuit between the winding of the guard relay 1R and the condenser C2. This circuit is traceable from the positive side of condenser C2, switch hook contacts 2S5, 2S4, 2S7, 2S8, retard coil 2L, switch hook contacts 2S3, 2S1, bus hL2, conductor 101, contacts 1c1, member 1SB, armature 1R1, contact 1R2, winding of relay 1R, conductor 100, bus 24 to the negative side of the condenser C2. The high voltage charge on condenser C2 then energizes relay 1R to cause the armature 1R1 to move to its latched or operated position. In this latter position, the resistance 1E1 is bridged across 1R1 and 1R2 to provide a continuous discharge path for condenser C2 when the armature 1R1 leaves contact 1R2. This insures that no voltage remains on condenser C2 and prevents the guard relay at any other station being operated when the telephone set is removed from the switch hook thereat. The resistor 1E1 and the impedance of the guard relay together constitute a high impedance circuit which insures against cross-talk between various stations.

The remaining operations of the system of Fig. 4 are identical with those of Figs. 1 and 2 and privacy is maintained under all the conditions above enumerated. Thus, if a third party should attempt to break in on two previously interconnected stations the alarm signal is transmitted to both of the interconnected stations but without notifying the interfering station that such an alarm is being given. The circuits for effecting this alarm are identical with those already described in connection with Figs. 1 and 2. Similarly, the system of Fig. 4 can be used to set up conference connections in exactly the same manner as described above in connection with Figs. 1 and 2.

While certain specific apparatus and circuits have been described herein, it will be understood that various changes and modifications may be made therein as will be obvious to those familiar with the art and without departing from the spirit and scope of the invention.

What is claimed is:

1. In a telephone system of the direct intercommunicating type, comprising a plurality of stations to be interconnected for communication, and with multipled line wires each one of which is a home wire for a corresponding station, the combination at each station of a telephone set, a series of station selector switches, a privacy guard relay having an operating winding which remains deenergized until a called station answers, a momentary acting switch at each station and connected to its home wire when it is answering a call as a called station, circuit connections including said momentary switch at the called station, the home wire of the called station and the corresponding operated station selector switch at the calling station to apply momentary energizing current to said relay winding at the calling station and thereby operate said relay to close the talking circuit between the calling and called stations, a common relay battery for supplying said current to the relays, and separate means to maintain said relay at the calling station operated to maintain the said talking circuit closed after the cessation of said momentary current.

2. An intercommunicating system comprising a plurality of stations each having a set of individual station selecting buttons, an intercommunicating multiple of line wires between the stations, a call signal device at each station, means including an operated button at a calling station for preparing a direct talking connection between the calling station and a desired called station, a signalling battery, said operated button at the calling station completing a circuit from said signal battery to the call signal device at said called station, a single relay at each station, a telephone handset at each station having associated therewith cradle-controlled contacts, certain of said contacts constituting a momentary circuit closing switch which responds momentarily as the handset is being removed from its cradle, and circuit connections completed through the momentary circuit closing contacts of said momentary switch at the called station and through the operated button at the calling station for operating only the single relay at said calling station and thereby completing said talking circuit and protecting said talking circuit against privacy invasion.

3. An intercommunicating system of the direct interconnection type, comprising a plurality of stations each having a telephone set, a plurality of station selector switches at each station one for each of the remaining stations, a single relay at each station for controlling privacy and for completing the talking connection between stations and which responds only when a called station answers, a plurality of multipled line wires each of which is a home wire for a corresponding station, circuit connections for operating said relay including a momentary acting switch at the called station and the home line wire of the called station and the operated station selector switch at the calling station, each telephone set also having additional contacts which are normally open when the set is on its support and which remain closed when the set is removed from its support and circuit connections controlled by said relay at the calling station and including said additional contacts for completing a talking circuit between the calling and called stations while preventing invasion of the said talking circuit by a third station regardless of which combination of station selector switches are operated at said third station.

4. An intercommunicating telephone system according to claim 3 in which a common relay battery is provided for all said relays, each of said relays having a winding which responds to a momentary current impulse controlled from a called station when answering an incoming call, and means for mechanically latching said relay in its operated condition independently of the called station for maintaining said talking circuit against privacy invasion independently of the said relay battery voltage.

5. A telephone intercommunicating system of the direct interconnection type comprising in combination a plurality of stations each having a telephone set and momentary circuit closing contacts, a plurality of station selector switches at each station one for each of the remaining stations, a privacy guard relay at each station which responds only when a called station answers, means including one of said switches at a calling station for signalling a called station, circuit means including the said momentary circuit closing contacts at the called station and the home wire of the called station and the operated selector switch at the calling station which circuit means is effective on answering by a called station to operate said guard relay at the calling station to complete a direct telephone talking circuit between the calling and called stations, and means effective when any third station attempts to break in on said talking circuit to transmit an alarm both to said calling station and to said called station over the line interconnecting said calling and called stations but without giving a corresponding alarm to said other station.

6. A telephone intercommunicating system of the direct interconnection type, comprising a plurality of stations each having a telephone set, each set having associated cradle-controlled contacts, a plurality of multipled line wires each of which is a home line for a corresponding station, each station having a plurality of station selector switches at each station one for each remaining station, a call signal device at each station, a signal battery common to all said signal devices, a privacy guard relay at each station, means to operate the said relay at a calling station under control of the cradle-controlled contacts of the called station, and circuit connections effective when a party at a third station operates a plurality of station selector switches including the one allotted either to the said calling station or the one allotted to the said called station and also one allotted to an idle station, to operate the call device at said idle station, and means including the said call signal device at said idle station to transmit to said calling and called stations over the interconnecting line therebetween an alarm which indicates attempted privacy invasion by said third station.

7. A telephone intercommunicating system of the direct interconnection type comprising a plurality of stations each having a telephone set, a plurality of station selector switches at each station one for each of the remaining stations, a single relay at each station for maintaining privacy and for closing the talking circuit between an interconnected calling station and a called station, a momentary circuit closing switch at each station, an audio frequency call signal device at each station, means at a calling station for operating said signal device at a called station, means controlled from the called station for transmitting a momentary current impulse to the relay at the calling station to operate it and thereby to close the telephone talking circuit between the calling and called stations, means mechanically latching said relay in its operated condition after the cessation of said momentary current impulse, a relay battery common to said relays, a call signal battery common to said call signal devices, circuit connections effective when the calling station is calling a called station to connect said signal battery to the call signal device at the called station, and means including the call signal device at a fourth idle station and effective when a third station attempts to break in on said talking circuit by operating a plurality of selector switches including the switch allotted to either said calling station or to said called station and a switch allotted to said fourth idle station for transmitting to said calling and called stations over their interconnected talking circuit a signal alarm but without transmitting said alarm to said third station.

8. In a telephone system of the direct itnercommunicating type, comprising a plurality of stations to be interconnected for communication, the combination at each station of a telephone set, a privacy guard relay having an operating winding, a source of operating potential common to all said relays and including a condenser and a charging circuit between said source and said condenser, circuits controlled from a called station for connecting said condenser in a discharging circuit to said relay winding to operate said relay at the calling station alone, and means to maintain said relay in its operated condition independently of said condenser and said potential source.

9. A telephone system according to claim 8 in which said condenser is normally charged to a potential which is many times that required to operate said relay.

10. A telephone system according to claim 8 in which said source of potential is connected to said condenser through a series current-limiting resistance.

11. A telephone system of the direct intercommunicating type comprising in combination a plurality of stations, a plurality of station selector buttons at each station one for each of the remaining stations, each of said buttons having a conductive portion which is in sliding contact with a common conductive member, a plurality of telephone lines one for each button multipled to the various stations, each of said buttons having a single contact connected to a corresponding one of said lines, a privacy guard relay having a movable armature and a pair of stationary contacts, means connecting said armature to said conductive member, a relay operating battery, means normally connecting one of said relay contacts to one end of the relay winding and to one terminal of said battery, means responsive to a called station answering a call to connect another terminal of said battery to the single contact of the operated button at the calling station allotted to said called line and thereby operating said relay, and means to maintain said relay in its operated condition independently of said battery.

12. A telephone system of the direct intercommunicating type comprising a plurality of stations, having at each station a plurality of station selector buttons one for each of the remaining stations, a privacy guard relay at each station said relay having an armture, a battery common to all said relays, a condenser charged from said battery, a single talking circuit contact for each button, a common conductive member for all the buttons at each station, means connecting said common conductive member to the armature of said relay and arranged to be connected to a particular switch contact corresponding to an operated button, a contact for each relay normally closed on its armature and connected to one end of the winding of the associated guard relay, a telephone handset including a cradle, a plurality of cradle-controlled contacts with certain of said contacts constituting a momentary switch effective as the handset at a called station is being removed from its cradle to connect said charged condenser to the other end of the said relay winding at the calling station and thereby to operate said relay, said relay having another contact which engages said armature when the relay is operated to connect the telephone transmitter and receiver at the calling station and at the called station to a common talking battery.

13. A telephone system according to claim 12 in which each of said buttons is also provided with a ringing control contact, and each button is arranged to be moved to completely operated position under manual pressure, which when released causes the button to spring back to a partially operated position, means connecting all the ringing control contacts at each station to a common ringing current bus, each button when completely operated bridging said ringing current bus to the associated talking circuit contact to apply ringing current to a ringing device at the called station.

14. A telephone intercommunicating system of the direct intercommunication type, comprising at each station a plurality of station selector buttons one for each of the remaining stations, a telephone handset, a call signal device, a single privacy guard relay at each station, circuit connections for operating said relays only when a called station takes its telephone handset into use, a signal battery common to all stations for operating the call signal devices, an alarm battery common to all stations for notifying only previously interconnected stations a third station is attempting to break in, a busy indicator at each station, circuit connections closed by the operation of a station selector button at a calling station for connecting the busy indicator at said calling station in circuit with said signal battery and the call device at the called station but without producing any busy indication on the indicator at the calling station, and other circuits effective when said called station is busy for connecting both said signal battery and said alarm battery to said busy indicator at the calling station to produce a busy indication.

15. A telephone system of the direct intercommunication type comprising a plurality of stations each having a set of station selector buttons one for each of the remaining stations, a single privacy guard control relay at each station, a momentary circuit closing switch at each station for applying a momentary operating current to the guard relay of a calling station to prevent privacy invasion between two normally interconnected stations, said relay when operated closing a talking circuit between said stations, and means at a called station for extending the said talking circuit to any other station to form a conference connection, and means effective to give an alarm only at the stations in the conference connection when an interfering station attempts to break in on the conference connection.

16. In a telephone system of the direct interconnecting type, comprising a plurality of stations to be interconnected for communication, the combination of a telephone set, a privacy guard relay having an operating winding, and a condenser at each station; a single source of potential for charging all said condensers when the associated telephone set is not in use, and circuits controlled from a called station for closing a discharging circuit from the condenser at the called station through the operating winding of the guard relay at the calling station to operate said relay by a discharge current from said condenser, and means to maintain said relay operated independently of said called station.

17. A telephone system according to claim 16 in which each of said condensers is connected to said source through normally closed contacts of a cradle switch controlled by the associated telephone set and is connected to the guard relay at a calling station through normally open contacts of the cradle switch at the called station.

18. In a telephone system of the direct intercommunicating type, a plurality of stations each having a set of station selector switches one for each remaining station, a single privacy guard relay for each station, a telephone set having switch hook-controlled contacts at each station, an intercommunicating multiple of line wires with one home line wire for each station, a battery common to all said relays for operating the relay at a calling station only under control of a called station, each of said selector switches having a single contact set for connecting the home line of the calling station with the home line of the called station and for preparing the operating circuit of the guard relay at the calling station to lock in the calling station against privacy invasion, the circuit for each guard relay being completed by the switch hook contacts of the associated telephone set when said telephone set is removed from said support to answer a call.

References Cited in the file of this patent

UNITED STATES PATENTS

| | | |
|---|---|---|
| 1,802,675 | Sisty et al. | Apr. 28, 1931 |
| 2,170,391 | Ruth | Aug. 22, 1939 |
| 2,181,715 | Waite | Nov. 28, 1939 |
| 2,385,515 | Herrick | Sept. 25, 1945 |
| 2,512,834 | Legerth | June 27, 1950 |
| 2,565,192 | Adler | Aug. 21, 1951 |